UNITED STATES PATENT OFFICE.

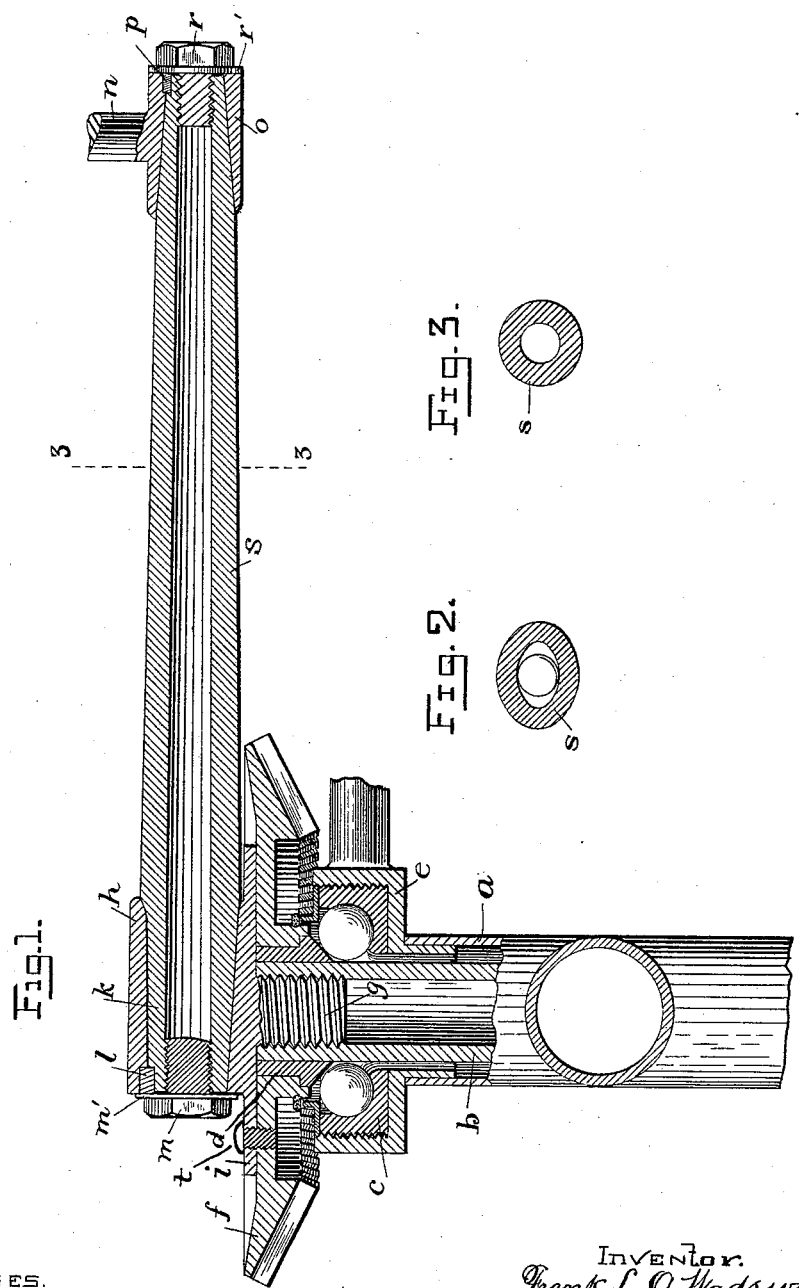

FRANK L. O. WADSWORTH, OF WASHINGTON, DISTRICT OF COLUMBIA.

DRIVING MECHANISM FOR BICYCLES.

SPECIFICATION forming part of Letters Patent No. 540,766, dated June 11, 1895.

Application filed January 9, 1894. Serial No. 496,296. (No model.)

*To all whom it may concern:*

Be it known that I, FRANK L. O. WADSWORTH, a citizen of the United States, residing at Washington, in the District of Columbia, have invented certain new and useful Improvements in Driving Mechanism for Bicycles; and I do hereby declare the following to be a full, clear, and exact description of the invention, such as will enable others skilled in the art to which it appertains to make and use the same.

My invention relates to bicycles in general and more particularly to the cranks thereof and means for securing the said cranks, and other elements of the driving gear in their relative positions.

The object of my invention is to so construct the said elements as that when assembled there may be no unsightly projections, and moreover, that the said elements may be held firmly together and be yet readily and easily disjointed from one another.

With the employment of the key for attachment of the crank to its shaft there is liability of loosening in addition to the fact that the crank is rendered difficult of removal as the key is oftentimes pressed and mutilated by the action of the crank which causes it to enter any crevices and uneven portions of the slot. Again, in its usual form the crank must be made solid in order that it may not be weakened by the perforations, and were they formed solid at the extremities their expense of manufacture would render them commercially impracticable. Finally, with my construction, the tubular formation, which may be either round or elliptical in cross section, the maximum strength is attained, and being simple of contour, is inexpensive and easily straightened after being bent.

In the accompanying drawings, forming a part of this specification, and in which like symbols of reference indicate similar parts in the several views thereof, Figure 1 is a view, principally in section, of a crank secured to its shaft in accordance with my invention. Fig. 2 is a section of one form of crank, showing its cross-section. Fig. 3 is a cross-section of a second form of crank.

Referring now to the drawings, $a$ is the crank hanger of a bicycle, of any form, and provided with a tubular axle $b$ arranged to be turned in suitably arranged bearings which may consist of the usual balls arranged to revolve in bushings $c$ and $d$, the former being turned into the enlarged portion $e$ of the crank hanger, while the latter is pressed onto the axle of the crank and extends to the outer end thereof. Pressed or keyed onto the extended portion of the bushing $d$, is a gear wheel $f$, should the transmission employed be " gear,"—and otherwise a sprocket wheel to receive a chain, which is the usual construction.

Turned into the end of the shaft $b$, which for this purpose is provided with a suitable internal screw thread, is the stud $g$ of the crank-hub $h$ provided with an annular flange $i$ which, through the medium of said stud, is brought to impinge the wheel $f$, to which it may be firmly secured by brazing or through the medium of a suitably disposed screw $t$ or a key. The hub $h$ is provided with a lateral, tapered slot to receive a correspondingly tapered end $k$ of a crank $s$, which if of circular cross section, may be provided with a key $l$ to prevent accidental turning; otherwise its form will contribute the desired retention.

Into the internally threaded end of the crank is turned a screw $m$ which acts to draw the crank into the hub socket and also to retain it therein, said screw having a washer $m'$ interposed between it and the end of the crank to assist in clamping. The outer end of the crank $s$ is also tapered, as shown, to enter a socket in the inner enlarged end of a pedal pin $n$, which said enlargement $o$ is formed integral with the pin. In the event of the employment of a round crank, a key $p$ is employed, as shown. Otherwise it is unnecessary, as is the case in the arrangement at the hub. A screw $r$, similar to $m$ is turned into the end of the crank, which is threaded for this purpose, said screw acting to press the pin thereonto and to hold it in place, a washer being imposed for purposes of clamping. The position of this screw is similar to that of $m$ and hence very little clamping is necessary to hold it in place and yet it may be readily removed and a tap on the crank will cause it to drop out. A pedal of any suitable construction may be arranged on the pin.

It will thus be seen that my constructions and arrangements provide a neat, effective and light driving mechanism.

Having now described my invention, its construction, and method of operation, what I claim is—

1. A crank driving-gear for bicycles comprising a tubular shaft, a bushing on said shaft, a gear wheel on said bushing, and a threaded stud turned into said shaft, said stud having a flange to impinge the bushing and gear wheel, and an enlarged head on the stud having a perforation to receive a crank.

2. A crank driving-gear for bicycles comprising a tubular shaft, a bushing secured on said shaft, a gear-wheel secured on the bushing and a threaded stud turned into the shaft, said stud having a flange to impinge the bushing and gear wheel, screws for securing said flange and gear wheel relatively to each other, and an enlarged head on the stud having a perforation to receive a crank.

In testimony whereof I affix my signature in presence of two witnesses.

FRANK L. O. WADSWORTH.

Witnesses:
 GEO. H. CHANDLEE,
 ALVAN MACAULEY.